United States Patent
Cave et al.

[11] Patent Number: 5,943,046
[45] Date of Patent: Aug. 24, 1999

[54] SYSTEMS AND METHODS FOR THE DISTRIBUTION OF MULTIMEDIA INFORMATION

[75] Inventors: Ellis K. Cave, Garland; Lyndel R. McGee, Richardson; Gary A. Wilson, Plano, all of Tex.

[73] Assignee: InterVoice Limited Partnership, Reno, Nev.

[21] Appl. No.: 08/503,997

[22] Filed: Jul. 19, 1995

[51] Int. Cl.[6] .................................................. H04N 7/173
[52] U.S. Cl. ........................... 345/327; 348/12; 348/473; 348/552; 455/5.1
[58] Field of Search ..................................... 345/327, 328, 345/302; 707/104; 370/487, 468; 395/200.47, 200.49; 348/384, 390, 7, 12, 13, 14, 15, 16, 17, 18, 19, 460, 461, 462, 473, 474, 478, 484, 552, 563, 564, 569, 589, 596, 600; 455/6.1, 5.1, 4.2, 10

[56] References Cited

U.S. PATENT DOCUMENTS

| | | |
|---|---|---|
| 4,422,093 | 12/1983 | Pargee, Jr. . |
| 4,920,432 | 4/1990 | Eggers et al. . |
| 5,132,992 | 7/1992 | Yurt et al. . |
| 5,318,450 | 6/1994 | Carver . |
| 5,327,554 | 7/1994 | Palazzi, III et al. . |
| 5,341,474 | 8/1994 | Gelman et al. . |
| 5,564,001 | 10/1996 | Lewis ........................................ 395/154 |
| 5,589,892 | 12/1996 | Knee et al. ............................. 348/731 |
| 5,640,195 | 6/1997 | Chida ........................................ 348/13 |
| 5,706,290 | 1/1998 | Shaw et al. ............................. 370/465 |

*Primary Examiner*—Chris Grant
*Attorney, Agent, or Firm*—Fulbright & Jaworski L.L.P.

[57] ABSTRACT

A method for transferring multimedia information in a system including a primary site 101 and at least one satellite site 102 coupled to the primary site 101 by a transmission medium 103. Information defining each of a selected plurality of objects composing a multimedia presentation is compressed at primary site 101 using a compression/decompression protocol corresponding to a type of each of the objects. The compressed information is transferred to satellite site 102 from primary site 101 via medium 103. Scene information describing the multimedia presentation to be made from the objects is also transferred from primary site 101. The compressed information defining each of the objects is decompressed at satellite 102 using the corresponding compression/decompression protocol. The multimedia presentation composed of the selected objects is generated at satellite site 102 from the decompressed information as directed by the received scene information.

41 Claims, 3 Drawing Sheets

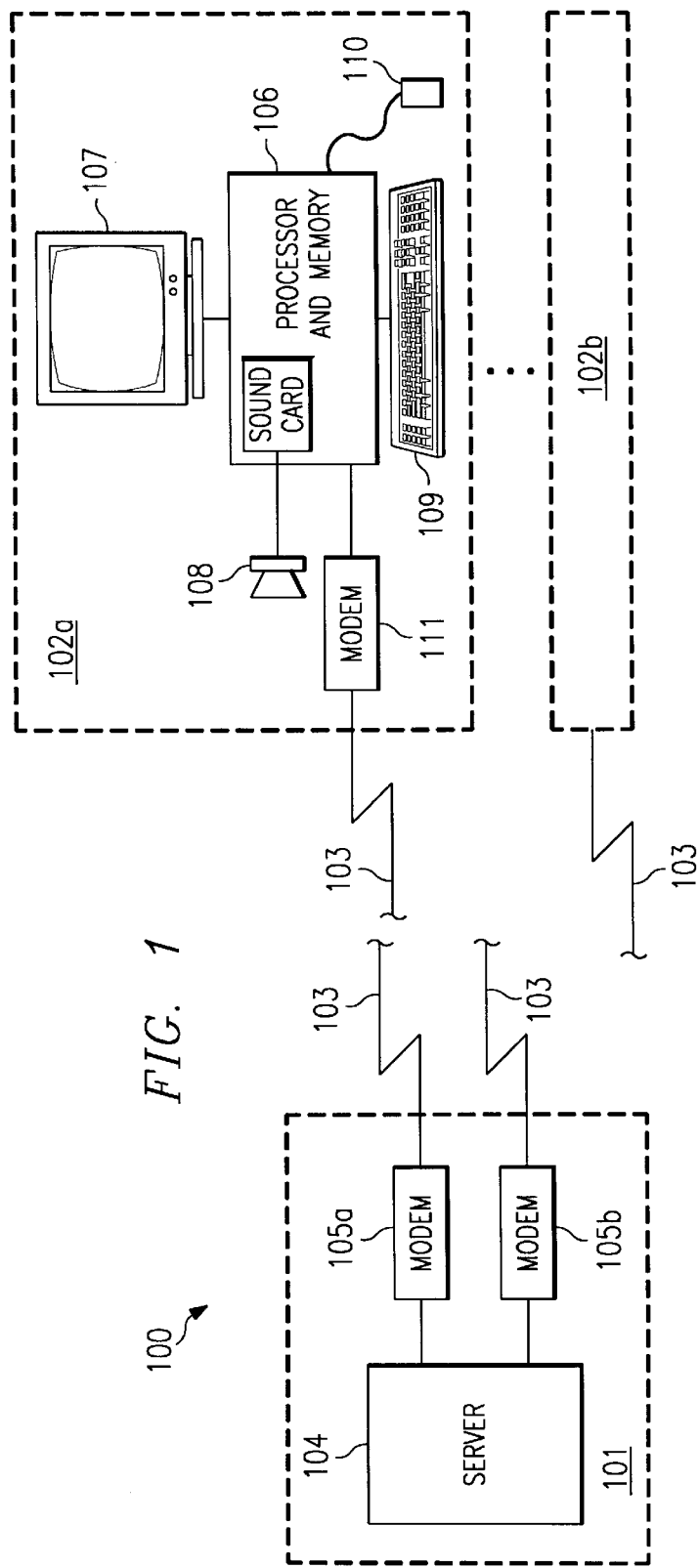
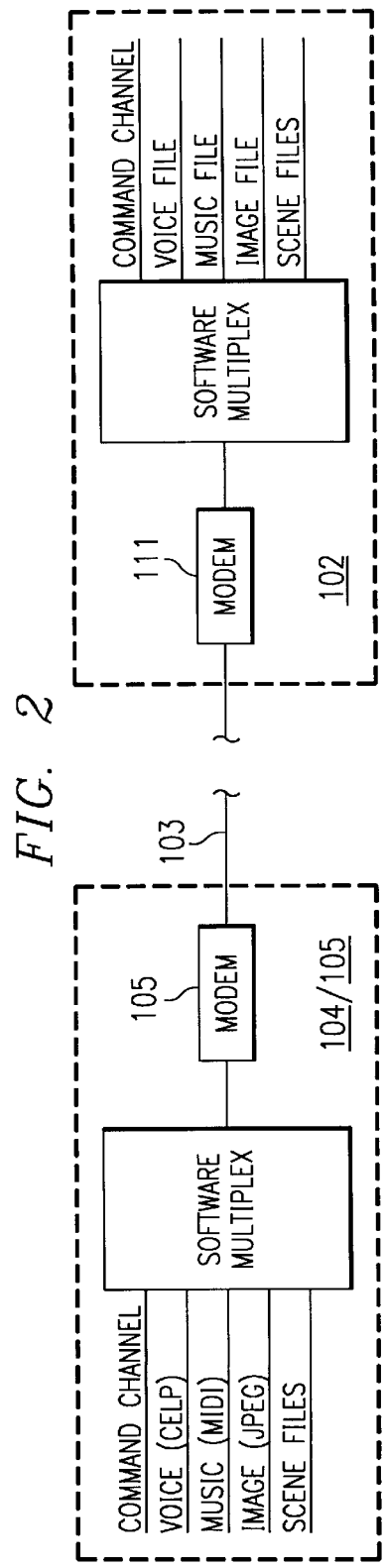
FIG. 1
FIG. 2

SYSTEMS AND METHODS FOR THE DISTRIBUTION OF MULTIMEDIA INFORMATION

TECHNICAL FIELD OF THE INVENTION

The present invention relates in general to communications and in particular to systems and methods for distributing multimedia information.

BACKGROUND OF THE INVENTION

With the development of high performance processing systems and improved communications links, transactions which in the past were conducted between parties face to face are instead being remotely conducted via electronic media. One of the most familiar of such systems is the automatic teller machine (ATM) which allows a bank customer to conduct a monetary transaction with his or her bank at times and locations more convenient than those usually provided by the bank's teller windows. Other communications systems such as electronic mail, audio/video teleconferencing, and computer networks are also helping relieve the expense and inconvenience which often results when various transactions must be conducted in person. While these systems have great advantages, they are still incapable of delivering to the end users all the information which can normally be exchanged, either explicitly or implicitly, during an in-person transaction. Further, because the amount and type of data which can be delivered is limited, the aesthetics of a given information exchange is correspondingly limited.

With these limitations in mind, recent efforts have been made to develop multimedia communications systems in which complete presentations of picture, voice and music can be provided to an end user. Not only would such systems generally allow for the communcation of more and different types of information, but would deliver such information in a more aesthetically complete format. The potential uses for such systems may include, for example, interactive applications such as movies-on-demand and home shopping.

One method of providing multimedia home shopping involves the exchange of media between the seller and shoppers via the postal system. For instance, a seller mails a CD-ROM or similar media containing a multimedia catalog to a shopper. The shopper then runs the CD-ROM catalog on the shopper's personal computer to peruse the goods or services offered for sale. A purchase can then be placed by telephone or by mail through a form generated from information stored on the CD-ROM. This option has several disadvantages. First, it may take up to several days for a CD-ROM catalog to reach the consumer. Second, CD-ROMs are relatively fragile, making mailing complicated and expensive. Third, each time the catalog is updated, a complete new CD-ROM typically must be mailed.

Another multimedia communications technique involves real-time video conferencing via personal computers. In this case, the personal computer of each party engaging in a conference includes a video camera, a microphone, speakers, a video capable display, and the circuit cards and software required to transmit voice and data. Disadvantageously, the required hardware is specialized and typically expensive. Further, no single standard has been recognized which limits the number of combinations of computers which can exchange information.

In Digital Simultaneous Voice and Data (DSVD) systems, voice and data are transmitted between computers on a single channel. The audio component is compressed in real-time at the transmitting terminal before transmission and then decompressed in real-time at the receiving terminal. The primary disadvantage of DSVD systems is that the real-time data compression operation requires substantial computing power. Hence, specialized modems with on-board digital signal processors are required which perform the compression/decompression operations thereby reducing the burden on the central processing unit. DSVD systems have the further disadvantage of requiring a fully digital link connecting the users.

Another current implementation alternates a connection between a voice call and a data call using a specialized voice/data modem protocol. While this system eliminates the processor bandwidth requirements of the DVSD modem, it also eliminates the capability of simultaneous delivery of voice and data.

In addition to the limitations of the available computer hardware and software, limitations on the available transmission (interconnection) media also constrain the implementation of interactive multimedia systems. One major obstacle is the limited bandwidth of the public telephone lines which currently are the most widely available and easily accessible interconnection media. Due to this limited bandwidth, the data transmission rates between terminals, and consequently the amount of data which can be exchanged, is severely impacted. Thus, most current data exchange schemes can only transfer the data for one media object at a time forcing the user interface to display (or play in the case of audio) only one media object at a time. Further, different types of media objects may require different bandwidths, resulting in inefficient use of the available transmission media. Interactive multimedia systems could be based on specialized transmission media such as cable or ISDN, but these are not widely available and require faster, specialized, interfaces.

Given the substantial advantages of multimedia presentations, namely the ability to communicate substantial amounts of information in an aesthetically pleasing fashion, the need has arisen for systems and methods for controlling and transferring multimedia presentations between a central processing system or server and a satellite system. In particular, such systems and methods should be capable of transferring multimedia data packages across limited bandwidth transmission media, such as the public telephone lines. Additionally, such systems and methods should enable the implementation of multimedia exchanges without requiring specialized hardware. Further, such systems and methods should be capable of utilizing a low bandwidth transmission medium to generate multimedia presentations including pictures, text, and music concurrently at the satellite in real-time. Preferably, these presentations can begin immediately after the connection between the server and the satellite has been established. Finally, while such systems and methods should be capable of use in a wide variety of applications, they should be particularly adapted for interactive applications, such as electronic home shopping.

SUMMARY OF THE INVENTION

In general, the principles of the present invention provide for the construction and operation of systems for distributing multimedia presentations over low bandwidth media such as the public telephone network. Advantageously, data defining multimedia objects can be "timely" delivered across the low bandwidth medium such that the corresponding multimedia objects (voice, music, pictures and text) can be immediately displayed at a satellite once a connection with a controlling server has been established. Further, data defining multimedia data can be concurrently delivered across the same low-bandwidth medium.

Multimedia information defining image, voice and music objects composing a given multimedia presentation is compressed and placed on a central processing system such as a server. The compression can be performed in either real-time or non-real-time. The central processing system also delivers to the end user terminal a scene file, which controls the assembly of the objects, into the desired presentation. Then, the server delivers, via a corresponding transmission medium, the compressed information to an end user terminal. The end user terminal decompresses the received compressed multimedia information in real-time, executes the scene file, and presents the resulting objects as a multimedia presentation. In this fashion, non-symmetrical compression technologies (i.e. where more processing power and bandwidth is required to compress than to decompress) can be used. These technologies are best suited for machine to human interaction.

According to one embodiment of the principles of the present invention, a method is provided for transferring multimedia information in a system including a primary site and at least one satellite site coupled to the primary site by a transmission medium. Information defining each of a plurality of objects composing a multimedia presentation is compressed and placed on the server at the primary site using a compression/decompression protocol corresponding to a type of each of the objects. The compression may be performed in either real-time or non-real-time. When the satellite site is coupled to the server, the compressed information is transferred to the satellite site from the primary site via the medium. Scene information describing a multimedia presentation to be made at the satellite site is transferred from the primary site. The compressed information defining each of the objects is decompressed at the satellite site, preferably in real-time, using the corresponding compression/decompression protocol. The multimedia presentation composed of the selected ones of the objects is generated at the satellite site from the decompressed information, as directed by the received scene information.

Advantageously, the server and client utilize several techniques to provide a feeling of "immediacy" to the multimedia presentation. One such technique is "progressive play/reveal," which allows the client to progressively play/reveal the object as it is being transferred from the server to the client. Another technique is "concurrent delivery," which allows the server to transfer multiple multimedia objects to the client simultaneously. A third such technique is "intelligent bandwidth allocation," which allows the server to intelligently control the bandwidth allocated to each concurrently delivered multimedia object to ensure that the bandwidth is used efficiently by the server. Taken together, these three techniques allow the multimedia presentation to proceed at a pace sufficient to keep a user's attention.

According to another embodiment of the principles of the present invention, a method is provided for presenting a multimedia presentation at a satellite computer coupled to a central computer over a restricted bandwidth transmission medium. A request is sent from the central computer to the satellite computer requesting that the satellite computer execute a scene file to generate a selected scene. The scene may contain one or more multimedia objects selected from the group consisting of image, voice, text and music. A determination is made as to whether the scene file is stored local to the satellite computer. If such scene file is not already stored local thereto, the satellite computer requests that the required scene file be transferred from the central computer. Once the scene file is stored locally, the scene file is interpreted by the satellite computer to determine which media objects are to be presented as the scene. Then, the satellite computer determines if the data necessary to generate such objects is stored local to the satellite computer. The satellite computer requests any required object information not already stored local to the satellite computer be delivered to the satellite computer from the central computer. The scene file is then executed in the satellite computer to generate the selected scene, the scene file controlling the generation and presentation of the multimedia objects of the scene from the object information.

According to a further embodiment of the principles of the present invention, a multimedia communications system is provided which includes a transmission medium, a central data processing system selectively coupled to the transmission medium, and a satellite processing system selectively coupled to the transmission medium. A compression tool is provided for compressing information defining each of a plurality of multimedia objects of a multimedia presentation using a selected corresponding compression/decompression protocol (preferably a different type of compression/decompression protocol is used for each type of media object) to produce compressed information. The central data processing system further transfers scene information defining the generation of the multimedia presentation from the objects. The compressed information may be stored at the central processing system and then transmitted on the transmission medium when called for in the scene information or stored local to the satellite and retrieved from the local files when called for in the scene files. The satellite processing system decompresses the information, either received from the transmission medium or the satellite local files, using the corresponding compression/decompression. The satellite processing system generates the multimedia presentation composed of the multimedia objects from the decompressed information in a format directed by the scene information.

According to an additional embodiment of the principles of the present invention, a system is provided for distributing multimedia information which includes a transmission medium, a server, and a slave processing system or client. Validation is preferably independent of scene file execution; the server may request that the slave check its local object files to confirm all information required for a given scene file is local to the slave. If such information is local, or in the alternative, after all the information is obtained from the server, the slave sends an acknowledgement to the server. The server is operable to compress information defining a plurality of objects composing a presentation using compression/decompression protocols corresponding to each type of object and transmit the compressed information on the transmission medium. The server is further operable to transmit on the transmission medium a scene file defining an assembly of the objects into the presentation. The slave processing system receives the scene file and receives and decompresses the compressed information from the transmission medium. The slave processor also validates the scene file by determining if the information defining ones of the objects required by the scene file to generate the presentation have already been received and stored locally. The slave processor then requests and receives from the server via the transmission medium any information defining a required object and which is not already stored locally. Finally, the slave processing system is operable to process the information in accordance with the scene file to generate the selected scene composed of the required ones of the objects.

According to yet another embodiment of the principles of the present invention, a multimedia system is provided which includes means for compressing information defining each of a plurality of objects of a multimedia presentation using a corresponding compression/decompression protocol. Means are also provided for transporting the compressed information to a satellite site. Means are further provided for transporting to the satellite site scene information describing a multimedia presentation to be generated from the objects defined by the transported compressed information. The satellite site includes means for receiving and decompressing the received compressed information using the corresponding compression/decompression protocol. Finally, means are provided at the satellite site for assembling the multimedia presentation composed of the objects generated from the decompressed information in a format defined by the received scene information.

Systems and methods embodying the principles of the present invention have substantial advantages over the prior art. In particular, the principles of the present invention can be applied equally to low and high bandwidth transmission media, including but not limited to, public telephone lines and wireless communication links. Further, the principles of the present invention can be implemented using conventional server and PC technologies. Additionally it should be recognized that, while the principles of the present invention can be used in a wide variety of applications, they are particularly adapted for interactive applications, such as electronic home shopping.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a high level functional block diagram of a multimedia communications system embodying the principles of the present invention;

FIG. 2 is a block diagram illustrating the logical protocol of the system depicted in FIG. 1;

DETAILED DESCRIPTION OF THE INVENTION

Figure 3:
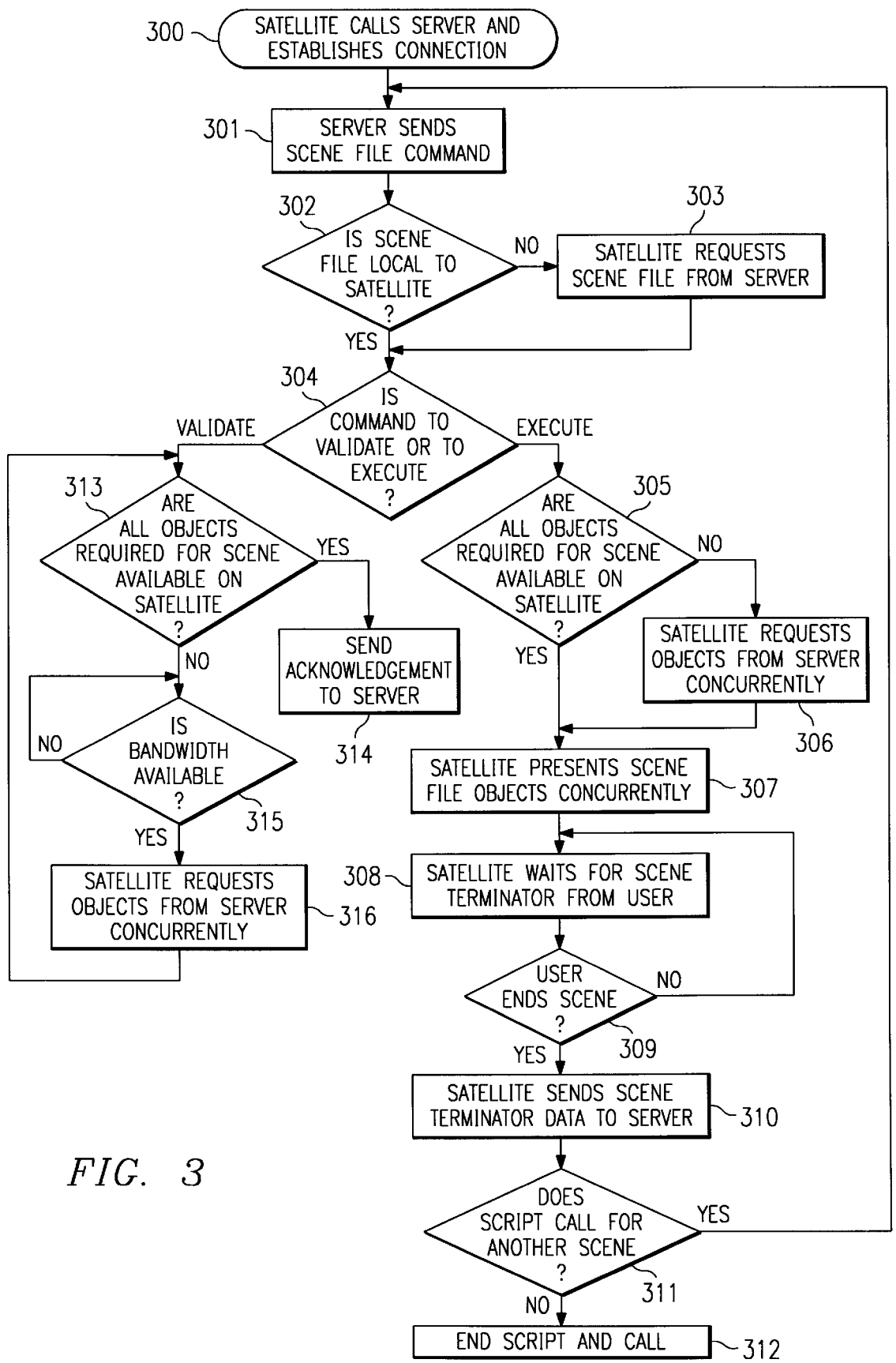
FIG. 3 is a flow chart describing a preferred method of operating the system depicted in FIG. 1.

The principles of the present invention and their advantages are best understood by referring to the illustrated embodiment depicted in FIGS. 1–4 of the drawings, in which like numbers designate like parts.

FIG. 1 is a high level functional block diagram of a multimedia information communications system 100 embodying the principles of the present invention. System 100 includes a primary site 101 and a plurality of satellite sites 102; a pair of satellite sites 102a and 102b are shown for reference. Each satellite site 102 can be selectively coupled to the primary site 100 via a transport media 103. According to the principles of the present invention, transmission medium 103 can advantageously be one of a number of a presently available low-bandwidth information transport media such as a conventional telephone line, although the present invention can be applied to state of the art information transport media such as fiber optic cables equally as well. It should also be noted that in alternate embodiments, transmission medium 103 may be replaced with a wireless communications link.

Primary site 101 includes a server or central processing system 104 and a plurality of modems 104 for exchanging data across medium 103. It should be noted that in a fully digital system, such as an ISDN telephone system, modems 105 may be replaced with ISDN adapters. In the illustrated embodiment where media 103 is a conventional telephone line carrying analog signals modems 105 may be for example any one of a number of standard 14.4 kbits/sec or 28.8 kbits/sec devices presently available. Advantageously, modems 105 may be conventional modems and do not have to be simultaneous voice/data modems, although specialized modems can also be used. In an ISDN system, the basic transmission rate will be 64 kbits/sec. Server 104 may be based for example on an IBM PS/2 model 77 processor running on an IBM OS/2 operating system.

Each satellite site 102 is preferably a personal computing system running a commonly available operating system such as DOS with Microsoft Windows 3.1 or OS/2. In general, the satellite site terminal includes a processing system 106 (including a microprocessor, RAM, ROM, and a hard drive and/or floppy disk drive), a display device 107 for displaying images, (e.g., graphs, video, and text), a sound device and speakers 108 for delivering voice, a synthesizer device for delivering music and a keyboard 109 and mouse 110 for user input. In the preferred embodiment, where a given satellite site 102 is configured to convey images, graphs, text, voice and music under control or server 104, as discussed in detail below, processing system 106 is preferably based on an Intel 486 microprocessor or better. In alternate embodiments, for example when only text, graphics and images are being processed to generate a presentation, processing system 106 may be implemented with an Intel 386 microprocessor or better.

Each satellite site 102 is selectively coupled to transport medium 103 through a modem 111 (unless an ISDN connection is being made, in which case modem 111 is replaced with an ISDN adapter). Modem 111 may be integral to the personal computer or a separate unit and have for example a bandwidth of 14.4 kbits/sec or 28.8K bits/sec, similar to modems 105. It should be noted that in alternate embodiments, satellite site 102 may be, or include, other processing systems such as another server, a network, or larger scale computer system.

According to the principles of the present invention, once a link is established with server 104, a multimedia presentation can be provided at a given satellite site 102 on demand. During the presentation, the satellite site 102 essentially becomes a slave to or client of server 104. Depending on the type of presentation, satellite-user supplied information can be returned to the server 104 via medium 103. For example, in the home shopping arena, the primary site 101 may be the offices of a merchandise retailer and the satellite sites 102 the personal computers in the homes of the customers. A multimedia presentation or "multimedia catalog" may then be provided by the retailer to the subscribing customer upon the customer's request. Using the audio and visual descriptions provided by the host (server 104), the customer can scroll/step through the multimedia catalog using either keyboard 109 or mouse 110 and select one or more products described therein by the seller. A purchase can then be completed through an interactive exchange between the customer's terminal (satellite 102) and server (central computer) 104. For example, the customer may be prompted to make a selection or accept a sale by clicking mouse 110 on a "pushbutton" generated on the display screen or by depressing keys on keyboard 109. In some embodiments, the customer's credit card can automatically be debited.

FIG. 2 is a block diagram illustrating the logical protocol of system 100. Server 104, under software control, transfers commands (requests), voice, music, image, and scene files. The voice, image and music files contain information (object information) which define the voice, image and music objects (components) which make up one or more multimedia presentations. The scene files contain a description of the assembly of the various media objects (voice, image, music, text) into a scene including spacial and/or temporal relationships as well as fonts, colors, etc. of the various objects as the scene is presented. Multiple scenes can be assembled into a script which tells a complete "story." Further, server 104 transfers commands which direct the generation of text, pushbuttons, and text entry boxes by the satellite site 102. The image, voice and music information being transported from server 104 are all compressed to better utilize the available bandwidth of media 103. In the preferred embodiment, the image information is compressed using the JPEG protocol, music using MIDI commands, voice using a CELP 4K or 8K protocol, and graphs using a vector format.

Each satellite site 102 in the preferred embodiment contains storage media for storing voice, music, image and scene files received from server 104. The received data may be stored in the received compressed state or may be decompressed prior to storage, depending on, among other things, the available memory space at the given satellite 102. It should be recognized that a scene file from the server may explicitly command the satellite not to save the information defining specific multimedia objects after generating a corresponding scene or presentation.

Each satellite site 102 decompresses the data received from server 104 under the established protocols. Under direction from commands in the scene file, a given satellite site 102 can process the decompressed image, voice and music information, and generate corresponding human comprehendible multimedia image, voice and music objects of a selected scene of a presentation in a specified order and format. In the case of text, display pushbuttons and textboxes, etc., commands in the scene files sent from server 104 define the content, size and location of the given object but satellite site 102 actually generates the required display.

Preferably, a timer starts and controls the presentation of these objects, with an object appearing or disappearing as defined by a timing parameter associated with that object. For example, an image may be given an appearance time and a persistence in relation to the timer. Similarly, the appearance of a pushbutton or the start of a voice or music clip may be timed by a delay from the start of timer, as defined by a timing parameter associated with the given voice or music object. A given scene can terminate in any one of a number of different ways. For example, a scene may terminate if the timer runs out, the voice file has been completely presented or the music has finished.

A presentation is preferably made from data local to the satellite site 102. This allows decompression optimization of processing tasks and utilization of the available bandwidth available on media 103. A presentation at a satellite site 102 can also be made either in whole or in part using data received in real-time from server 104. In this case, if all or part of the data (voice/sound, image or music) required to execute a scene is not already stored in the files local to satellite 102, the missing data is requested and delivered by server 104 and immediately decompressed and presented as the scene is being executed. The transport rates (i.e the modem baud rates or the ISDN basic rate) and the bandwidth of media 103, will determine the rate at which a presentation can be generated in real-time. Typically, even with lower baud rate modems and low-bandwidth transport media, all of the voice/sound and music information can be transported from server 104 and presented by satellite 102 in real-time without difficulty. Images however may take longer to transport and display, depending on the number of pixels per image and the number of bits used to define each pixel.

Therefore, the present invention employs several techniques to increase the feeling of "immediacy" or responsiveness to the user. One such technique is "progressive play/reveal." According to this technique, a multimedia object is played or revealed, depending on the object type, by the satellite 102 as it is being received from the server 104. Only media objects of significant size need to be revealed during transmission to distract the user from the transmission times involved. Typically, voice, music, and image objects have sizes large enough to require progressive play. For example, a picture file can be painted on the screen as it is downloaded or an audio file can be playing while it is being transferred to the satellite 102.

During a progressive reveal, an image is built by transporting, decompressing, and displaying pixels of only selected portions of an image at a time. For example, an image "fade-in" may be achieved as data for every 16th pixel of a frame is transported and displayed until the entire image is complete. Numerous other "fade-in" options are possible for improving the "quick feeling" of the presentation and conserving bandwidth. As another example, an image may be progressively revealed on the screen by transporting and displaying pixel data on display line by display line basis from the top, bottom, or other focal point, or off the screen.

Two other techniques used by the present invention to improve user interface responsiveness are "concurrent delivery" and "intelligent bandwidth allocation." Using these two techniques, the available bandwidth of the transmission media 103 is intelligently allocated among the various objects being transmitted, depending on the object type. Synchronous media objects such as voice and music are allocated just enough bandwidth to keep the satellite 102 supplied with data to avoid interruptions of the play. Non-synchronous objects such as images or text are sent using all remaining bandwidth not allocated to synchronous transmissions. These two techniques are particularly advantageous when low bandwidth modems, such as 14.4 kbits/sec modems are being used in real-time applications.

In preferred embodiments of intelligent bandwidth allocation and concurrent delivery, event messages, such as scene files, command and control messages, and button push messages have the highest priority. These event messages typically require a bandwidth on the order of 100 kbits/sec. The compressed voice data has the second highest priority. To maintain an uninterrupted real-time presentation of voice data at the satellite 102 as it is received from server 104, a bandwidth of at least 8 kbits/sec is required. MIDI music commands receive the third highest priority in the preferred embodiment. The MIDI commands typically require 1 kbit/sec of bandwidth. The compressed image (picture) data receives the fourth highest priority. The bandwidth utilized for the image data is variable, depending on what is available in view of the available bandwidth of media 103 and modems 105 and 111, and the bandwidth required for transmitting the higher priority objects. Images can be progressively revealed as data is received or the data can be assembled and the entire corresponding image delayed until it can be revealed. It should be recognized that the bandwidth utilization priority can be modified. For example, if the voice data is to be stored (before or after decompression) rather than be immediately decompressed and presented in real-time, less bandwidth can be allocated to voice data and dedicated to another object.

It should be recognized that bandwidth allocation according to the principles of the present invention is dynamic. Dynamic bandwidth allocation is possible because the number and type of objects being presented during the execution of a scene typically varies with time. For example, a scene may initially be composed of simultaneously presented voice, image and text objects. As the scene progresses, the composition may change and the presentation of one or more of these objects may halt. As a result, additional bandwidth is available on transmission medium 103. For example, the voice object of a scene may stop while the satellite user pauses to read or analyze the visual portion of the scene. In this case, approximately 4 kbits/sec of bandwidth becomes available for other tasks. Among other things, the additional bandwidth may be used to speed up delivery of the image portion of the scene, if transfer from the server is not complete, or may be used for transferring and validating an upcoming scene (as will be discussed below). Dynamic bandwidth allocation is particularly advantageous when real-time presentations are being made and bandwidth is at a premium.

Transfer of information between server 104 and satellite 102 according to the preferred embodiment generally follows the following procedure. The end user through corresponding satellite 102 sends a request over the message channel. This request may be for example for the information corresponding one or more multimedia objects required by a scene file being run and which is not already local to the satellite. Assume for discussion purposes that the preferred priority scheme discussed above is being used and that at least the voice and image objects required for the scene file being run are not local. Also assume for discussion purposes that a 14.4 kbits/sec modem is being used and that the presentation at the satellite is being performed in real-time as information is received from the server.

Server 104 starts sending CELP voice data using 8 kbits/sec of the available 14.4 kbit/sec of bandwidth to a buffer or buffers within processor/memory 106. This buffer (or buffers) may be capable of holding all the information defining an entire object. Music is simultaneously sent to a buffer or buffers using another 1 kbit/sec of the available bandwidth. The remaining 5.4 kbits/sec of bandwidth is used to transfer image data to an image buffer or buffers. When the voice buffer is full or when the information for a complete voice object has been sent and stored, the 8 kbits/sec of bandwidth which had been dedicated to transferring voice data can be used to transmit image or music data. As voice data is being retrieved and decompressed and presented, the voice buffer(s) empties and voice data can once again be transferred from the server. In this case, the required 8 kbits/sec of bandwidth is shifted back to the task of transferring voice data.

Priority can also be determined based on the temporal relationship between the objects being displayed. For example, while only one voice file and/or one music file can be played at a time during a given scene, multiple pictures (images) may be simultaneously displayed on the PC screen. In this case, the bandwidth available for image data is shared between the multiple images being transmitted and displayed. Sharing of bandwidth between images data is particularly advantageous when the corresponding images are being decompressed and displayed in real-time, although this technique is equally applicable when the image data is to be stored prior to display image generation.

To further optimize processing efficiency, as one scene is being executed, one or more additional scenes, including the scene files and the corresponding image, voice and music information, may be downloaded and stored in the local files. This may occur for example when it is known, or highly likely, that a given scene always follows the current scene or when a high degree of probability exists that the end-user will call for new scene in response to the presentation of current scene. This feature increases efficiency and speed since an entire scene presentation can be transported to the satellite 102, decompressed and prepared for execution once the current scene has terminated.

In sum, the principles of the present invention provide the substantial advantages of "immediacy" and "concurrency." Presentations are immediate because they can occur almost immediately after establishment of the server/satellite connection. There is no need to wait until the files containing the information defining the various objects of a given scene have been received; the presentation can be made as information is received. Concurrency is provided since multiple objects (voice, images, text, music) can be presented simultaneously to compose one or more scenes, especially in real-time.

FIG. 3 is a flow chart illustrating a preferred method of providing multimedia presentations in the environment of system 100, according to the principles of the present invention. The method starts at Step 300 when the user, through the user's satellite 102, establishes a connection with server 104. For example, the end-user may place a call through the corresponding modem 111 and the public switched telephone network to the primary site 102. This call could be placed for instance through the use of an "800" number provided to the users of a given multimedia service. On receipt of the call, an unoccupied modem 105 at primary site 101 is assigned and if the server 104 recognizes the calling party (e.g. via a password or caller ID, etc.), the link is established.

At Step 301, server 104 sends a scene file command to satellite 102. This command directs the satellite to either execute or validate a scene file. As will be discussed below, one scene file may be executed concurrently with the validation of another scene file, depending on, among other things, the available bandwidth. Satellite 102 makes the determination of whether the command is to execute or validate a scene file at Step 304.

At Step 302, connected satellite 102 checks its memory file to determine if the scene corresponding to the received command is already available locally. For example, an initial scene or scenes common to most transactions may always be stored in the satellite 102 for efficiency. If the required scene file is already local to connected satellite 102, processing proceeds to Step 304. If the requested scene file is not local to the satellite 102, a request for that scene file is sent back to server 104 at Step 303 and the required scene file is delivered to satellite site 102. As discussed above, the scene file defines for a given scene, the timing, order and duration (persistence) of the images to be displayed, the timing of any music to be played, and the timing of any voice or sound components. The scene information also defines the generation of any text (e.g. font, size, location, etc.) and any pushbuttons (e.g. size, color, location, etc.) by satellite 102.

Once the necessary scene is local, the satellite determines at Step 304 whether the command is to validate or execute the scene file. Assume for discussion purposes that the command is to execute the scene file. Processing then proceeds to step 305.

At Step 305, satellite 102 analyzes (validates) the scene file to determine at Step 305 whether the information defining each of the multimedia objects required to execute the scene are available local to the satellite (in either a compressed or decompressed form). If the information for one or more of the required objects are not found locally, a request is sent at Step 306 to server 104 and the missing information is delivered to the satellite, otherwise processing continues at Step 307.

Figure 4:
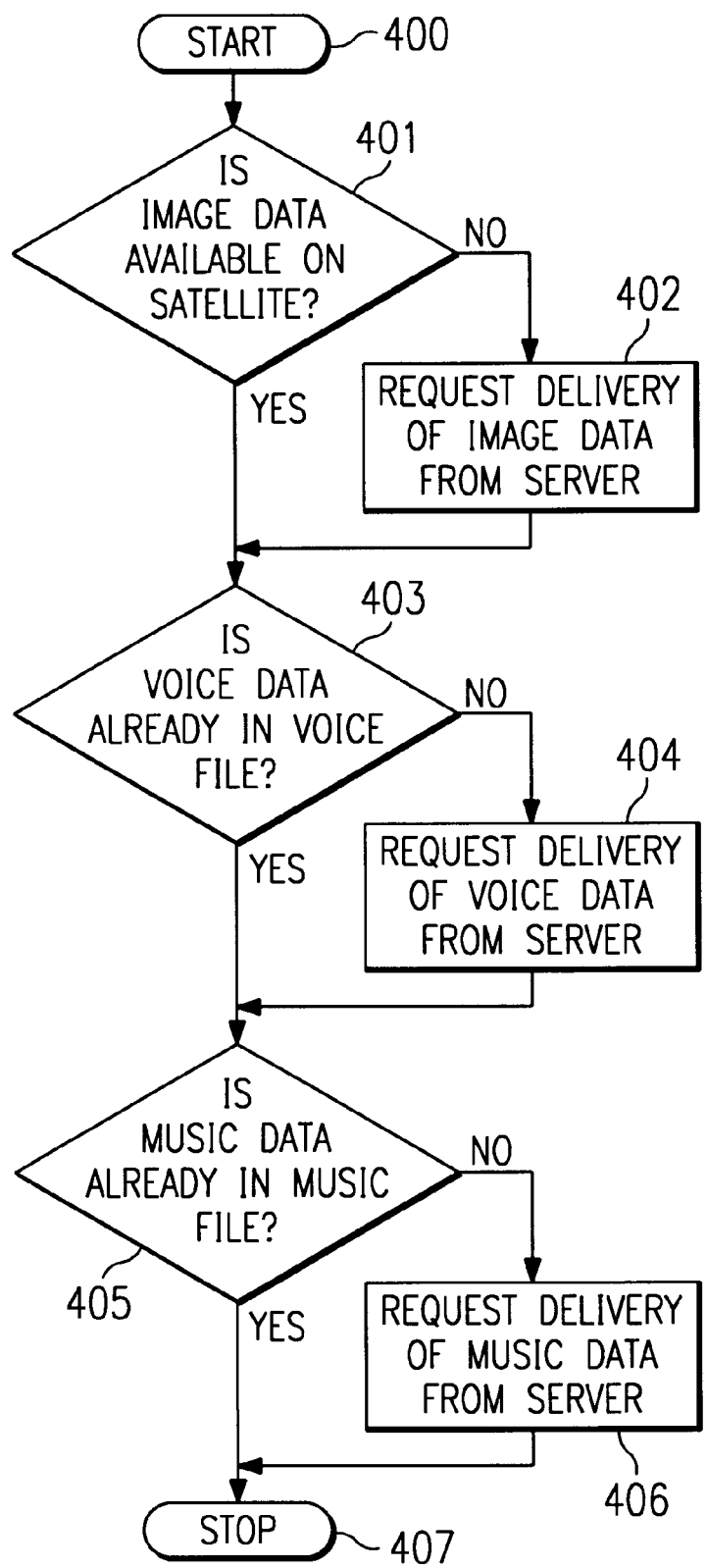
FIG. 4 is a flow chart depicting a preferred embodiment of the validation subroutine shown in the flow chart of FIG. 3.

A preferred method of performing Steps 305 and 306 is illustrated in further detail in FIG. 4. At Step 400, the method starts. At Step 401, satellite 102 determines whether or not the required image information is in the local image file, if it is not, a request is made at Step 402 and the data delivered from server 104. Next, at Step 403, satellite 102 determines if the voice/sound information is already local and if it is not, then at Step 404, a request is made of server 104 and then required information delivered. Similarly, at Step 405 the satellite music file is checked for the music (MIDI) instructions required for the scene. If the required music instructions are not found, then at Step 406, a request is sent to the server and the music instructions transported to satellite 102. The information received in response to Steps 402, 404, and 406 may be stored in the image file compressed or decompressed, or decompressed and immediately used to generate the corresponding scene ("real-time presentation"). It should be noted that in alternate embodiments, the step order of the method of FIG. 4 may vary.

Once all the required information is either stored locally or is being transported from server 104, satellite 102 can generate the presentation at Step 307. Advantageously, multiple objects can be presented concurrently in real-time (i.e., as received from server 104) as a consequence of the allocation of the bandwidth of media 103 according to the principles of the present invention. It should again be noted that delivery of an object is independent of the "play" or "display" of that object. In other words, all server originated objects (pictures, voice; or music) can be played or displayed either immediately (i.e., in real-time) or anytime after delivery and storage.

In the home shopping environment, this initial scene may be for example an introductory scene which introduces the customer to the "multimedia catalogue" and provides appropriate menu selections allowing the customer to focus on a given product or line of products.

In the embodiment illustrated in FIG. 3, satellite 102 waits for scene terminator action from the user at Step 308. At Step 309, the user at Step 309 ends the scene, for example by clicking on a display button with a mouse or by depressing a keyboard key or keys.

On termination of the scene presented at Step 309, the scene information and the required image, voice and music information may be saved automatically or on user request. The amount of information stored will depend on such factors as the potential future need for the information, the type of information, or user request. For example, the music for one scene may be used for several other scenes and therefore would most likely be automatically saved. In the home shopping environment, the initial scenes introducing the customers to the system and providing menus for stepping/scrolling through the multimedia catalog may also be repeatedly used and thus saved. The satellite user may save a given scene or scene by clicking on a display pushbutton.

At Step 310, the satellite 102 sends scene termination data to server 104 indicating that the scene is over. In response, server 104 at Step 311 determines if the script defining the presentation being made calls for the generation of another scene. If the scene is the last in the presentation, or if the satellite user commands, then at Step 312 the presentation terminates and server 104 and satellite site 102 disconnect. On the other hand, if the script calls for the generation of another scene at Step 311, then processing returns to Step 301.

Assuming for discussion purposes that at Step 304 a command to validate a selected scene is received from server 104. Again, validation may be performed concurrently with the execution of the current scene or completely independent of the scene's execution. It should be noted that "pre-validation" is not necessary. A scene can be validated during the execution process at Steps 305 and 306 discussed above.

At Step 313, satellite 102 determines if the information describing all of the objects of the scene being validated is local. Preferably, this step follows the procedure set forth in FIG. 4, discussed above. If all the required information is available, an acknowledgement is sent to server 104 at Step 314. With this acknowledgement, when an execution command for the validated scene is received at Step 304, the scene can be immediately executed at Step 304.

If the information describing one or more of the objects of the scene being validated are not stored locally, a bandwidth check is first performed at Step 315. As discussed above, bandwidth allocation according to the present invention is dynamic. Thus, if another scene is simultaneously being executed and bandwidth becomes available, such bandwidth may be used to transfer information across media 103 to support the scene validation process. Typically, if execution of a scene requires transfer of information across media 103, that process takes priority over a simultaneous validation process.

If at Step 315, a determination is made that bandwidth is available, the satellite 102 initiates a transfer of the required information from the server at Step 104. If bandwidth is not available, satellite 102 waits until such time as sufficient bandwidth is available.

Although the present invention and its advantages have been described in detail, it should be understood that various changes, substitutions and alterations can be made herein without departing from the spirit and scope of the invention as defined by the appended claims.

What is claimed is:

1. A method of transferring multimedia information in a system including a primary site and at least one satellite site selectively coupled to the primary site by a transmission medium having a bandwidth, the method comprising the steps of:

compressing information defining each of a plurality of objects of a multimedia presentation at the primary site using a compression/decompression protocol corresponding to a type of each of the objects;

intelligently allocating the transmission bandwidth to the compressed information for each of the plurality of objects and to scene information describing a multimedia presentation to be made at the satellite site from selected ones of the objects;

concurrently transferring, over the allocated bandwidth, the compressed information for each of the plurality of objects and the scene information to the satellite site from the primary site via the medium;

decompressing the compressed information defining each of the objects at the satellite site using the corresponding compression/decompression protocol; and generating the multimedia presentation composed of the selected objects at the satellite site from the decompressed information as directed by the received scene information, at least two of the selected objects being presented concurrently.

2. The method of claim 1 wherein the objects comprise image and voice.

3. The method of claim 2 wherein the objects further comprise music.

4. The method of claim 2 wherein the information defining image objects is compressed and decompressed using a JPEG protocol and the information defining voice objects is compressed and decompressed using a CELP protocol.

5. The method of claim 3 wherein the information defining music components is compressed and decompressed using a MIDI protocol.

6. The method of claim 1 and further comprising the step of storing at least some of the information received from the primary site in the satellite site prior to said step of generating the presentation.

7. The method of claim 6 wherein said step of decompressing the at least some of the information is performed prior to said step of storing the at least some information components in the satellite site.

8. The method of claim 1, further comprising the step of progressively playing/revealing selected ones of the objects as the object information is being transferred.

9. A method of presenting a multimedia presentation at a satellite computer coupled to a central computer by a transmission medium comprising the steps of:

sending a request from the central computer to the satellite computer requesting the satellite computer execute a scene file to generate a selected scene from at least two multimedia objects selected from the group consisting of image, voice, and music;

determining if the scene file is stored local to the satellite computer;

delivering the required scene file to the satellite computer if such scene file is not already stored local thereto;

determining if object information required by the scene file to generate the multimedia objects for the selected scene is stored local to the satellite computer;

delivering any required object information not already stored local to the satellite computer to the satellite computer; and executing the scene file in the satellite computer to generate the selected scene, the scene file controlling the generation of the multimedia objects of the scene from the object information.

10. The method of claim 9 and further comprising the step of transferring at least some of object information to the satellite computer compressed in accordance with a selected corresponding protocol prior to said executing step.

11. The method of claim 10 wherein object information defining image object is compressed in accordance with a JPEG protocol, object information defining music components is compressed in accordance with a MIDI protocol and object information defining voice components is compressed in accordance with a CELP protocol.

12. The method of claim 10 and further comprising the steps of:

decompressing at least some of the component information according to the corresponding protocol; and storing the decompressed object information prior to said executing step.

13. The method of claim 9 wherein said step of delivering comprises a step of delivering any required object information to the satellite computer compressed in accordance with a selected corresponding protocol.

14. The method of claim 13 wherein object information defining image objects is compressed in accordance with a JPEG protocol, object information defining music objects is compressed in accordance with a MIDI protocol and object information defining voice objects is compressed in accordance with a CELP protocol.

15. The method of claim 13 and further comprising the step of decompressing any information delivered in response to said step of delivering according to the corresponding protocol.

16. The method of claim 15 wherein any information delivered during said step of delivering and decompressed during said step of decompressing is used by the scene file during said step of executing to generate a corresponding component in real-time.

17. The method of claim 9 and further comprising the step of storing the scene file local to satellite computer after completion of said step of executing.

18. The method of claim 9 and further comprising a step of transferring object information defining components of another scene during said step of executing the scene file.

19. The method of claim 9, further comprising the steps of:

intelligently allocating a transmission bandwidth associated with the transmission medium to the required scene file and the required object information; and concurrently transferring, over the allocated bandwidth, the required scene file and the required object information from the central computer to the satellite computer.

20. The method of claim 9, wherein the generation of the multimedia objects is performed progressively as the required object information is being delivered.

21. A multimedia communications system comprising:

a transmission medium having a bandwidth;

a central data processing system selectively coupled to said medium, said central data processing system operable to:

compress information defining each of a plurality of multimedia objects of a multimedia presentation using a selected corresponding compression/decompression protocol to produce compressed information;

intelligently allocate said transmission bandwidth to said compressed information for each of said plurality of multimedia objects and to scene information defining generation of said multimedia presentation from said objects; and concurrently transfer, over the allocated bandwidth, said compressed information for each of said plurality of objects and said scene information; and a satellite processing system selectively coupled to said transmission medium operable to:

decompress said compressed information received from said transmission medium using said corresponding compression/decompression protocol to produce decompressed information; and generate said multimedia presentation composed of said multimedia objects from said decompressed information in a format directed by said scene information.

22. The system of claim 21, wherein the satellite processing system is further operable to progressively play/reveal said multimedia objects as said objects are transferred over said transmission medium.

23. The system of claim 21 wherein said objects comprise at least two objects selected from the group consisting of images, voice and music.

24. The system of claim 23 wherein said central processing system is operable to compress said information defining image objects using a JPEG protocol, compress said information defining voice objects using a CELP protocol, and compress said information defining music components using a MIDI protocol.

25. The system of claim 21 wherein said central processing system comprises a server.

26. The system of claim 21 wherein said satellite processing system comprises a personal computer.

27. The system of claim 21 wherein said transmission medium comprises a telephone line.

28. The system of claim 21 wherein said central processing system includes a modem for coupling to said transmission medium.

29. The system of claim 21 wherein said satellite processing system includes a modem for coupling to said transmission medium.

30. A system for distributing multimedia information comprising:

a transmission medium;

a server operable to:

compress information defining a plurality of objects composing a presentation using compression/decompression protocols corresponding to each type of object;

transmit said compressed information on said transmission medium;

transmit on said transmission medium a scene file defining an assembly of said objects into said presentation; and transmit commands on said transmission medium controlling execution of said scene file; and a slave processing system operable to:

receive said scene file from said transmission medium;

receive and decompress said compressed information;

determine if said scene film has already been received and stored locally;

determine if information defining ones of said objects required by said scene file to generate said presentation have already been received and stored locally;

request and receive from said server via said transmission medium any information defining a required object not already stored locally; and process said information in accordance with said script to generate said selected scene composed of said required ones of said objects.

31. The system of claim 30 wherein said server is operable to transmit commands to said slave system directing said slave system to generate text for visual display.

32. The system of claim 30 wherein said server is operable to transmit commands to said slave system directing said slave system to generate display pushbuttons.

33. The system of claim 30 wherein said slave processor is operable to transmit interactive requests and commands to said server via said transmission media in response to prompts presented during said presentation.

34. The system of claim 30 wherein said multimedia objects comprise image, voice and music information components of said presentation.

35. The system of claim 30 wherein said compression/decompression protocol for said information defining image objects comprises JPEG, said compression/decompression protocol for said information defining voice objects comprises CELP, and said compression/decompression protocol for said information defining music objects comprises MIDI.

36. A multimedia system comprising:

means for compressing information defining each of a plurality of objects comprising a multimedia presentation and scene information describing the multimedia presentation to be generated from said objects using a selected corresponding compression protocol;

means for transporting said compressed information to a satellite site;

said transporting means comprising transmission means for transmitting information, said transmission means having a bandwidth;

means for intelligently allocating said bandwidth to said compressed information; and means for concurrently transferring said compressed information over said allocated bandwidth;

means at said satellite site for receiving and decompressing said information using the corresponding decompression protocol; and means at said satellite site for generating said multimedia presentation composed of said objects from said decompressed information in a format defined by the received scene information.

37. The system of claim 36, wherein said means at said satellite site further comprises:

means for progressively playing/revealing said information as said information is being transported by said means for transporting.

38. The system of claim 36 wherein said means for transporting said compressed information comprises a conductive cable.

39. The system of claim 36 wherein said means for transporting said compressed information comprises a fiber optic cable.

40. The system of claim 36 wherein said means for transporting said compressed information comprises a wireless link.

41. A method of transferring multimedia information in a system including a primary site and at least one satellite site selectively coupled to the primary site by a transmission medium having a bandwidth, the method comprising the steps of:

compressing information defining each of a plurality of objects of a multimedia presentation at the primary site using a compression/decompression protocol corresponding to a type of each of the objects;

intelligently allocating the transmission bandwidth to the compressed information for each of the plurality of objects and to scene information describing a multimedia presentation to be made at the satellite site from selected ones of the objects;

said step of intelligently allocating the transmission bandwidth comprising allocating the minimum amount of bandwidth necessary to allow continuous play of the selected synchronous objects to the selected synchronous objects and allocating the remaining amount of bandwidth to the selected non-synchronous objects;

concurrently transferring the compressed information for each of the plurality of objects and the scene information to the satellite site from the primary site via the medium over the bandwidth allocated for each of the selected objects;

decompressing the compressed information defining each of the objects at the satellite site using the corresponding compression/decompression protocol; and generating the multimedia presentation composed of the selected objects at the satellite site from the decompressed information as directed by the received scene information, at least two of the selected objects being presented concurrently.

\* \* \* \* \*